United States Patent
Shimane et al.

(10) Patent No.: US 6,469,462 B2
(45) Date of Patent: Oct. 22, 2002

(54) CONTROL APPARATUS FOR ELECTRIC VEHICLE

(75) Inventors: Iwao Shimane, Wako (JP); Satoru Adachi, Wako (JP); Hiroaki Takanohashi, Wako (JP); Yuji Saito, Wako (JP); Hajime Kondou, Wako (JP); Kenichiro Kimura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 31 days.

(21) Appl. No.: 09/733,050

(22) Filed: Dec. 11, 2000

(65) Prior Publication Data

US 2001/0015631 A1 Aug. 23, 2001

(30) Foreign Application Priority Data

Dec. 10, 1999 (JP) ............................................ 11-352410

(51) Int. Cl.[7] ................................................. H02P 7/00
(52) U.S. Cl. ...................... 318/280; 318/432; 318/434; 318/799; 318/801
(58) Field of Search ............................ 318/65, 66, 101, 318/739, 757, 759, 798–802, 256–265, 280–284, 286, 139–140, 432–434

(56) References Cited

U.S. PATENT DOCUMENTS 5,289,890 A * 3/1994 Toyoda et al. ............. 180/65.7
5,414,339 A * 5/1995 Masaki et al. ............... 318/139
5,934,398 A * 8/1999 Hotta .......................... 180/65.4
5,963,442 A * 10/1999 Yoshida et al. .............. 318/801
6,137,247 A * 10/2000 Maehara et al. ............. 318/140

FOREIGN PATENT DOCUMENTS

JP          A-9-56182          2/1997

* cited by examiner

Primary Examiner—Marlon T. Fletcher
(74) Attorney, Agent, or Firm—Arent Fox Kintner Plotkin & Kahn

(57) ABSTRACT

A control apparatus for an electric vehicle is provided, which is capable of reducing the weight of the electric vehicle and preventing the inverter circuit from overheating. When the vehicle stops on an uphill due to stalling, the control unit 30 starts counting the time over which current is supplied through the same IGBT element. When the count value reaches a value corresponding to the time at which the IGBT 40 starts generating heat, the control unit 30 outputs a control signal to reduce the motor driving current to the IPM 20. The rotation sensor 60 detects the rotational position when the motor rotates in the reverse direction, while the reduction of the motor driving current reduces the driving power of the motor. Based on the detection of the rotational position, the control unit 30 performs switching of the phase of the IGBT 40, and when the normal current supply phase is connected, the motor driving current which drives the motor is increased.

2 Claims, 5 Drawing Sheets

Fig. 5

CONTROL APPARATUS FOR ELECTRIC VEHICLE

BACKGROUND OF THE INVENTION

1. Field of the Invention

The present invention relates to a control apparatus installed in a hybrid vehicle or in an electric vehicle.

2. Background Art

A control device for electric vehicles, driven by the output of a motor, controls the driving current of motor, which rotates according to the depression of the accelerator pedal. That is, a directing current (control signal) for controlling an inverter, which outputs the driving current of the motor, is output to the inverter for driving the vehicle.

However, during normal operation (that is, the motor is rotating and the vehicle is moving), current supply phases of the power elements in the inverter circuit are shifted to other phases in sequence. However, when climbing a hill, the rotation of the motor will stop if the torque of the motor required for climbing equals or exceeds the maximum torque of the motor. When the motor is stopped, a current passes through a particular power element, that is, the power element supplies current continuously, which results in an abnormal temperature rise in that particular element. Conventionally, power elements with an increased current capacity or cooling devices with an increased cooling capacity are provided in the vehicle in order to overcome the problem of burning out the power elements when current flows through the power element continuously. Such a countermeasure results in an increase in the size, weight, and finally the cost of the devices.

SUMMARY OF THE INVENTION

It is therefore an object of the present invention to provide a control apparatus for an electric vehicle which is capable of preventing an increase of the weight of the vehicle and the overheating of the inverter circuit.

In order to attain the above objective, the first aspect of the invention provides a control apparatus for an electric vehicle which has a motor (in the present embodiment, the motor 50) driven by electric power supplied from an inverter (in the present embodiment, the IGBT 40) and which is propelled by an output of said motor, comprising: a power reducing device (in the present embodiment, the control unit 30) for reducing the electric power to be supplied to an electric power element (in the present embodiment, IGBT element) when the temperature of the electric power element of said inverter circuit exceeds a predetermined temperature; a rotation detecting device (in the present embodiment, the rotation sensor 60) for detecting the rotational position of the motor when rotating in the reverse direction after said power reducing element has reduced the electric power supplied to the electric power element; a switching device (such as a control unit 30 in the present embodiment) for switching from the electric power element which currently supplies electric power to the inverter circuit, to another electric power element for supplying electric power in response to the detection of rotation by said rotation detecting device; and an electric power increasing device for increasing or starting the supply of said electric power to said electric power element after said switching device performed the switching.

With the above arrangement, the control apparatus of the electric vehicle of the present invention is provided such that, when the vehicle stops on a steep uphill because the load applied to the motor equals the maximum output of the motor, or when the temperature of an electric element of the inverter circuit exceeds a predetermined temperature, the control apparatus of the electric vehicle reduces or terminates the supply of the electric power to the motor. Accordingly, due to the reduction in the output of the motor, the vehicle starts moving in reverse. Then, the rotational position of the motor in the reverse direction is detected, and, in response to the detected rotation, the electric power element normally supplying power to the inverter circuit is then switched to another element in order to continuously supply power to the motor and maintain the driving force of the vehicle so as to not move backward. The control apparatus of the electric vehicle of the present invention is constituted such that it maintains or increases the current supply to the motor, and since the electric power element, after a switch is made so that it is not the current supply element normally supplying the current is no longer heated, it is possible to protect the elements constituting the inverter circuit from overheating. Thereby, it becomes possible to use an element (for example, an IGBT element), which has a standard low current-carrying capacity for constituting the inverter circuit, which results in a reduction in the cost of the apparatus.

According to the second aspect, in the control apparatus of an electric vehicle according to the first aspect, the electric power reducing device reduces the electric power supplied to said electric element, in any one of the following cases: when the temperature detected by said temperature sensor (such as the temperature sensor 22 in the present embodiment) for detecting the temperature of said electric power element exceeds a predetermined temperature, or when the length of time for supplying electric power by the same power element exceeds a predetermined time (such as the count value of the control unit 30 in the present embodiment).

With the above arrangement, since the control device is constituted such that heat generation of the power elements can be estimated through the detection by the temperature sensor or by the length of time of the supply of the power in the same power supply phase, the temperature of the power element can be controlled according to the generated heat, and the power element can be protected from overheating.

BRIEF DESCRIPTION OF THE DRAWINGS

FIG. 5 shows a timing chart for explaining the operation of the control apparatus shown in FIG. 1.

DETAILED DESCRIPTION OF THE INVENTION

Figure 1:
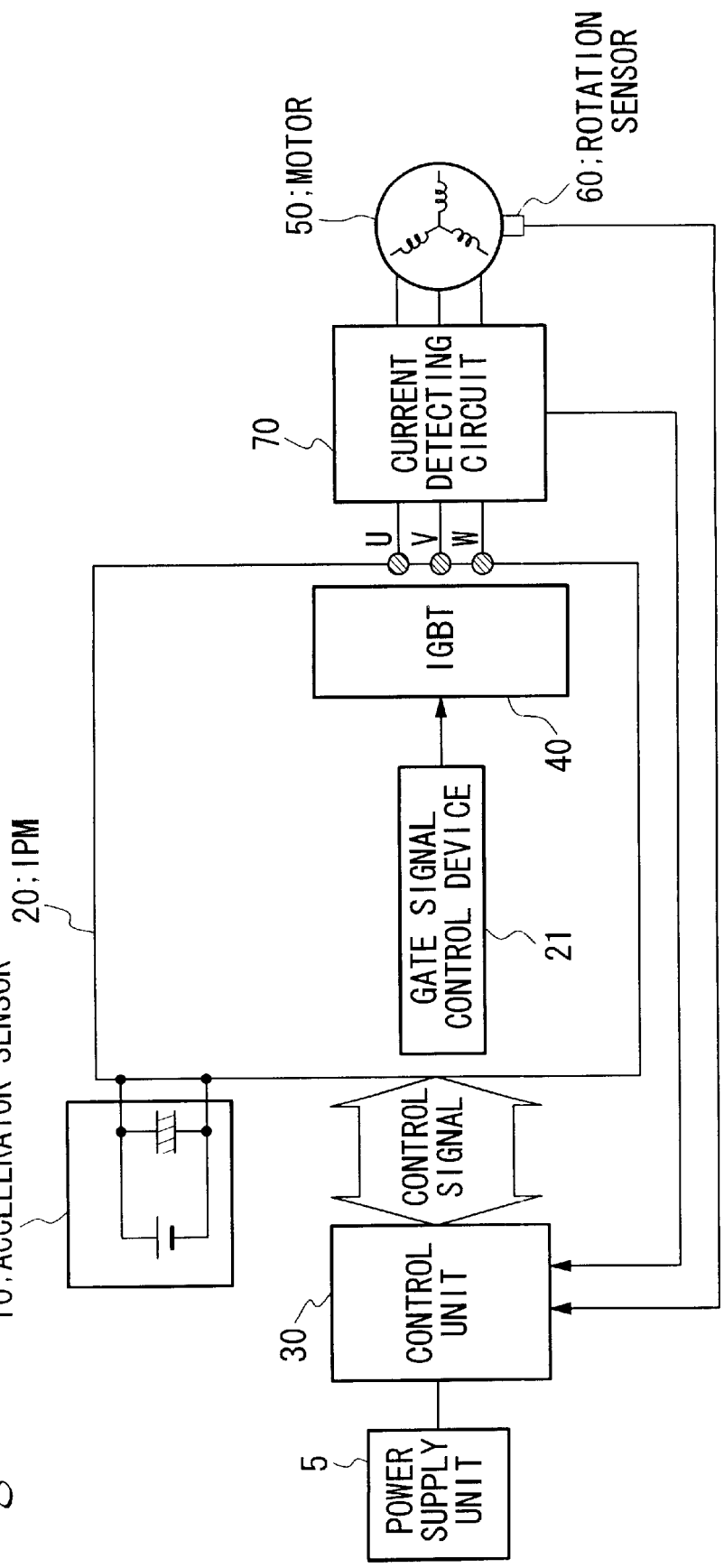
FIG. 1 is a schematic block diagram showing the structure of a control apparatus of an electric vehicle according to the first embodiment of the present invention.

Hereinafter, an embodiment of the present invention is described with reference to the attached drawings. FIG. 1 is a schematic block diagram showing the structure of a control apparatus for an electric vehicle according to the first embodiment of the present invention. In FIG. 1, reference numeral 10 denotes an accelerator sensor for detecting the depression of the accelerator pedal and for constantly outputting the detected result to a control unit 30. Reference numeral 5 denotes a power source unit for supplying, a power to driving the motor 50.

An IPM (Intelligent Power Module) 20 comprises a gate signal control device 21 and IGBT (Insulated Gate Bipolar Transistor) 40. The gate signal control device 21 controls the operation of the IGBT based on a control signal output from the control unit 30. The gate signal control device 21 outputs a gate signal to each gate terminal of the IGBT based on the control signal output from the control unit 30 to, the IPM 20.

The control unit 30 determines a motor driving current to be supplied to the motor 50 from the power supply unit 5 based on the resulting output from the accelerator sensor 10. In addition, the control unit 30 outputs a signal to the IPM 20 for switching the current supply phase for supplying a current to the load terminal of the IGBT 40 based on the resulting output from a rotation sensor 60, described below.

Furthermore, the control unit 30 counts the time required to supply the gate signal to the gate terminal for a particular current-supply phase. The control unit 30 stores a preset count number as a count value, which has been obtained in response to the detected current value of the output from a current detecting circuit 70 and which corresponds to the time required for the IGBT 40 to generate heat, and, when the time reaches the count value, then the control unit 30 performs control to suppress heat generation in the IGBT (the details will be described below). The motor 50 is rotated by the motor driving current, which is output and supplied by the IGBT in the IPM 20. An example of the motor used in the electric vehicle is an induction motor.

Figure 2:
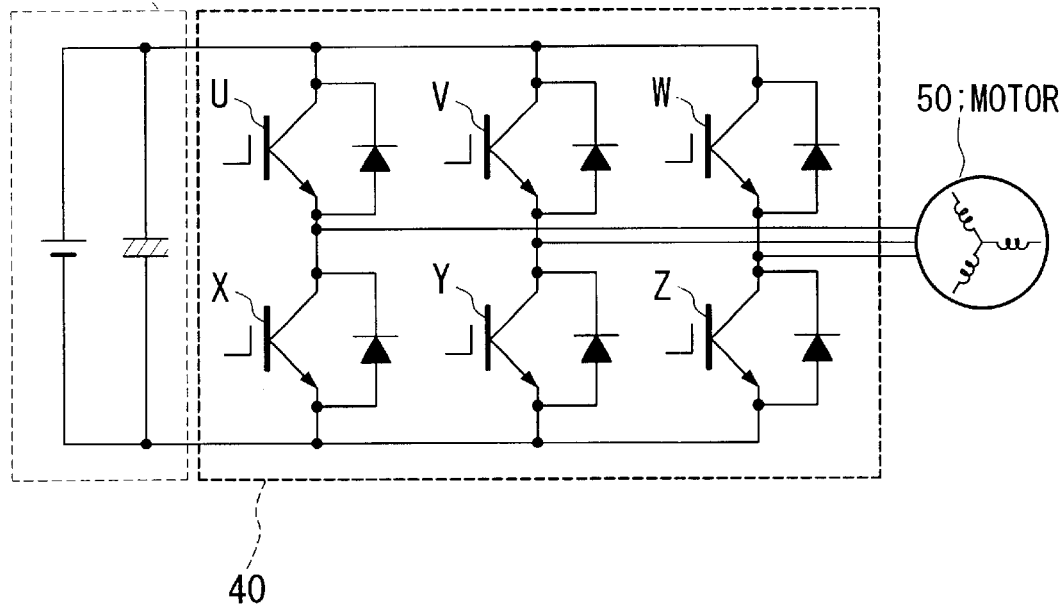
FIG. 2 is a schematic structural diagram explaining the connection between the IGBT element 40 and the motor 50 shown in FIG. 1.
Figure 3:
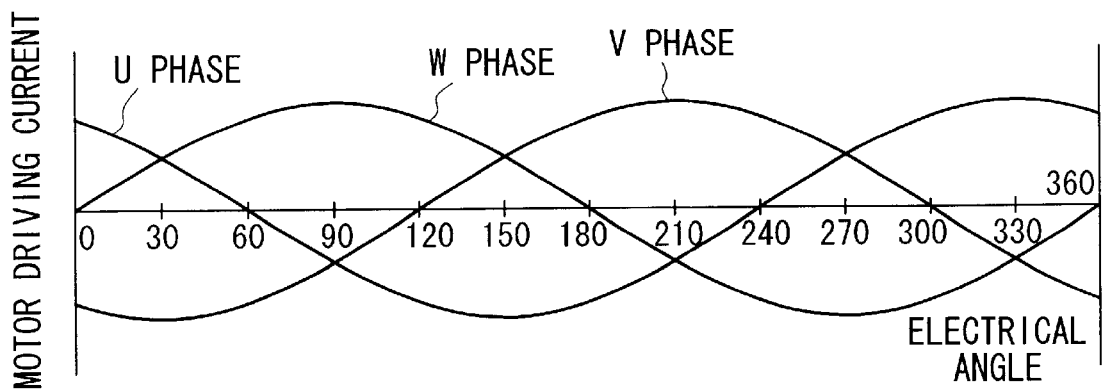
FIG. 3 is a diagram showing the waveforms of the motor driving currents supplied to the motor from the IGBT 40.

Next, the motor driving current supplied to the motor 50 from the IGBT 40 is described with reference to FIGS. 2 and 3. FIG. 2 is a schematic diagram for explaining the connection between the IGBT 40 and the motor 50, and FIG. 3 is a diagram showing waveforms of the motor driving currents. First, as shown in FIG. 2, the IGBT 40 comprises six IGBT elements U, V, W, X, Y, and Z, and two diodes.

The gate terminals of the respective IGBT elements U, V, W, X, Y, and Z are respectively connected to the output terminal of the gate signal control device 21, and the gate signal is input into the above gate terminal. Each of the IGBT elements U, V, W, X, Y, and Z is changed to the current supplying state based on the gate signal, and each pair of U and X, V and Y, and W and Z respectively supplies motor driving currents in the form of balanced three phase alternating currents corresponding to U, V, and W phases. The waveforms of these phases are shown in FIG. 3. As shown in FIG. 3, the phase differences of the U, V, and W phases are 120 degrees.

In FIG. 1, reference numeral 60 denotes a rotation sensor for detecting the rotational position and the rotational state of the motor 50 and for outputting the detected results to the control unit 30. Reference numeral 70 denotes a current detecting circuit for detecting the motor driving current supplied to the motor 50 and for outputting the detected current value to the control unit 30.

Figure 4A:
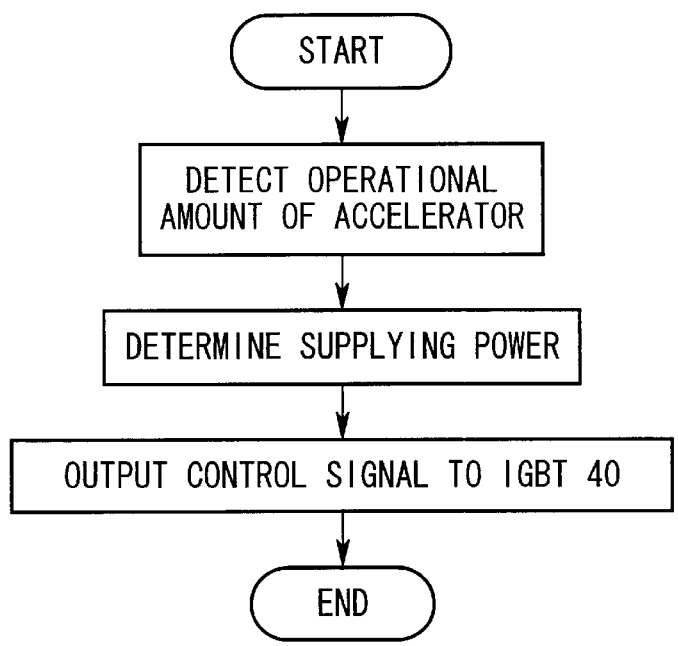
FIGS. 4A and 4B show flowcharts for explaining the operation of the apparatus shown in FIG. 1.
Figure 4B:
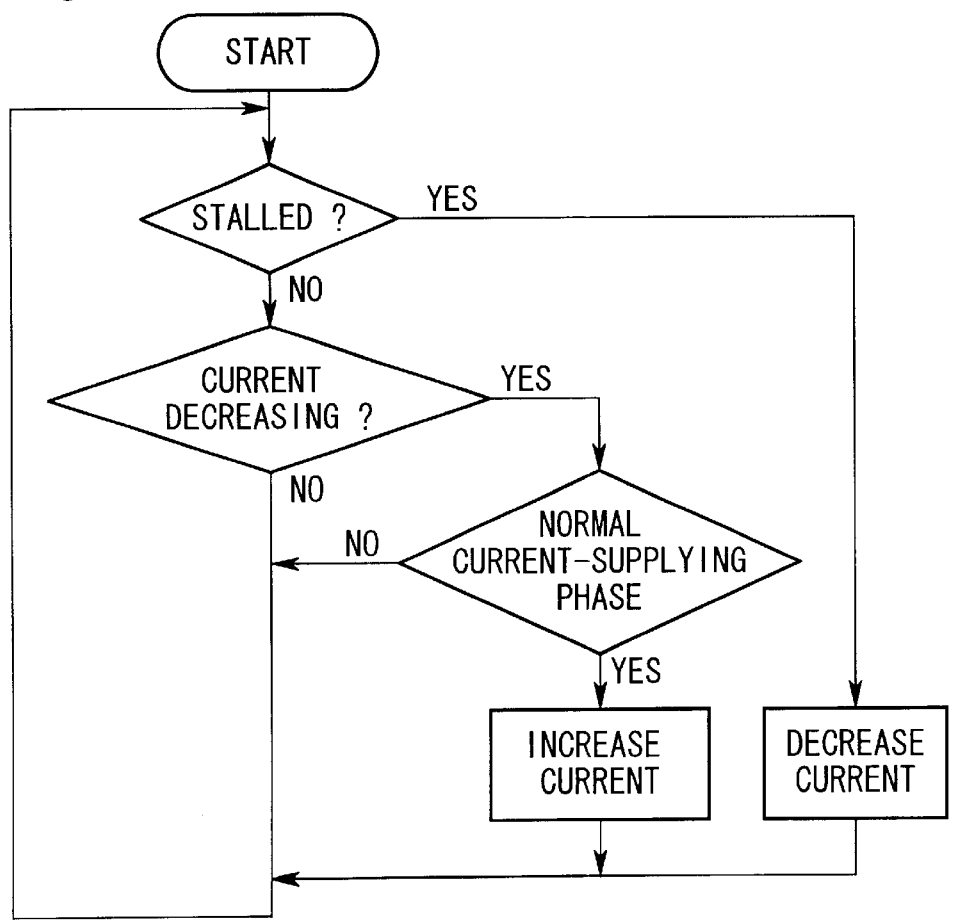

The operation of the above-described control apparatus of the electric vehicle is described below with reference to the flowchart shown in FIG. 4. First, as the vehicle starts moving when the driver depresses the accelerator pedal, the accelerator sensor 10 detects the amount of depression (step S1), and the detected result is output to the control. unit 30. The control unit 30 reads the detected result from the accelerator sensor 10 and outputs a control signal corresponding to the supply of power to the IPM 20 (step 30). The IPM 20 outputs a gate signal to the IGBT 40 through a gate signal control device 21 based on the control signal from the control unit 30.

When the gate signal is input into the IGBT 40, the IGBT element corresponding to the gate signal is energized and the IGBT 40 supply the motor driving current to the motor 40. The motor 50 is normally rotated by the motor driving current supplied from the IGBT 40. At this time, the current detecting circuit 70 detects the motor driving current to be supplied to the motor 50 from the IGBT 40. During normal travel, the control unit 30 repeats the above-described operations and the vehicle travels due to the switching the current supply phase of the IGBT 40 in sequence according to the Next, if the vehicle approaches a steep uphill and the motor 50 is locked by the stopping of the rotor (a stalled state) while the motor 50 is being supplied with a predetermined motor driving current, the rotation of the motor is stopped. At this time, when the rotation sensor 60 detects the "stopping" of the motor 50, the rotation sensor 60 outputs the detected result to the control unit 30. When the control unit 30 receives the detected result of the "stopping" from the rotation sensor 60 and detects that the vehicle is in a "stalled" state (the result in step S4 is "YES"), counting of the current supply time starts. When the count value corresponding to the detected result output from the current detecting circuit 70 is reached while the motor is stalled, the control unit 30 outputs a control signal so as to reduce the motor driving current in the present current supply phase (step S6).

Next, the IPM 20 outputs a gate signal for reducing the motor driving current to the IGBT through a gate signal control device 21 based on the control signal output from the control unit 30. In response to the gate signal, the IGBT 40 reduces the motor driving current to be output to the motor 50. As a result, the driving force of the motor is reduced. When the driving force of the motor 50 is reduced, although the force of gravity acts on the vehicle so as to move the vehicle backward down the slope of the hill, the vehicle is substantially maintained in place (the details will be described below). The wheels of the vehicle, however, may rotate in the reverse direction due to the force of gravity to move the vehicle backward; thereby the motor rotates in the reverse direction.

Next, since the stall control continues, the control unit 30 determines that the result of the determination in step S4 is "NO", and the flow proceeds to step S5. The control unit 30 determines that the result of determination in step S5 is "YES", since the command to the IPM 20 for reducing the motor driving current is still being executed, and the flow proceeds to step S7. In step S7, the control unit 30 detects whether the prescribed current supply phase is connected by rotating one phase in reversed direction. If the prescribed current supply phase is not connected (when the result in S7 is NO), the control unit 30 repeats the above operation until the prescribed current supply phase has been connected.

In contrast, when the prescribed current supply phase is connected, the control unit 30 outputs a control signal to increase the motor driving current to the IPM 20 in step S8. The IPM 20 outputs a gate signal to increase the motor driving current to the IGBT 40 based on the control signal output from the control unit 30. The IGBT 40 then supplies an increased motor driving current to the motor 50.

When the motor 50 receives the increased motor driving current, the driving force of the motor increases. In addition, the above-described control operation in the stall state is repeated, and the vehicle is held in the position where it had entered the stalled state.

Figure 5:
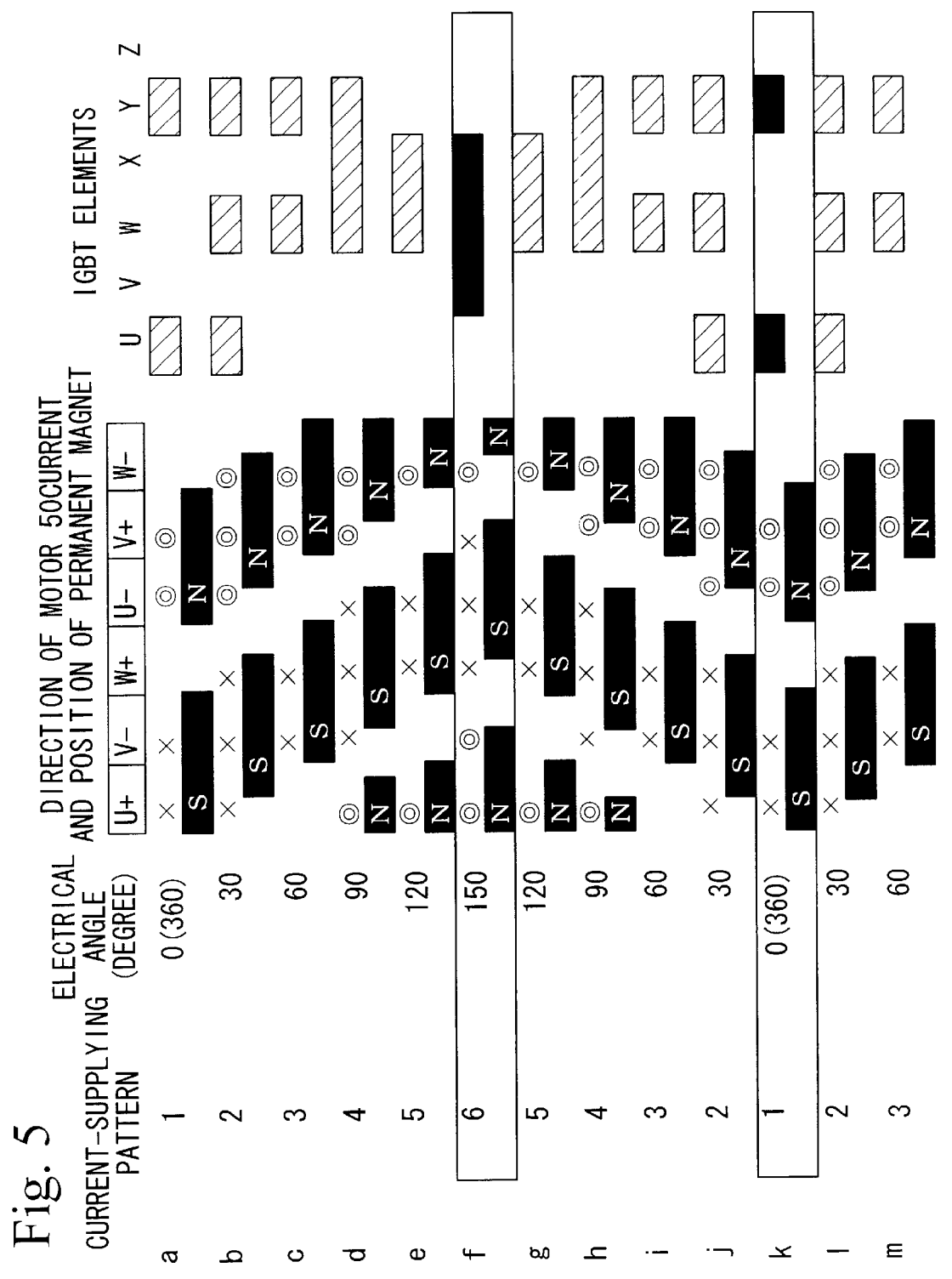

The operation of the control apparatus in the above-described stall state is explained with reference to the time chart of FIG. 5. In FIG. 5, the region denoted by the symbols S and N represent the S and N poles of the permanent magnet. U+, V−, . . . , W− represent the orientations of the vectors of the motor driving current. In addition, the mark X represents the orientation of the motor driving current that pointing inward forward the rear side of this sheet of paper, and the mark ⊙ represents the orientation of the motor driving current as pointing outward from the front side of this sheet of paper.

Figure 6:
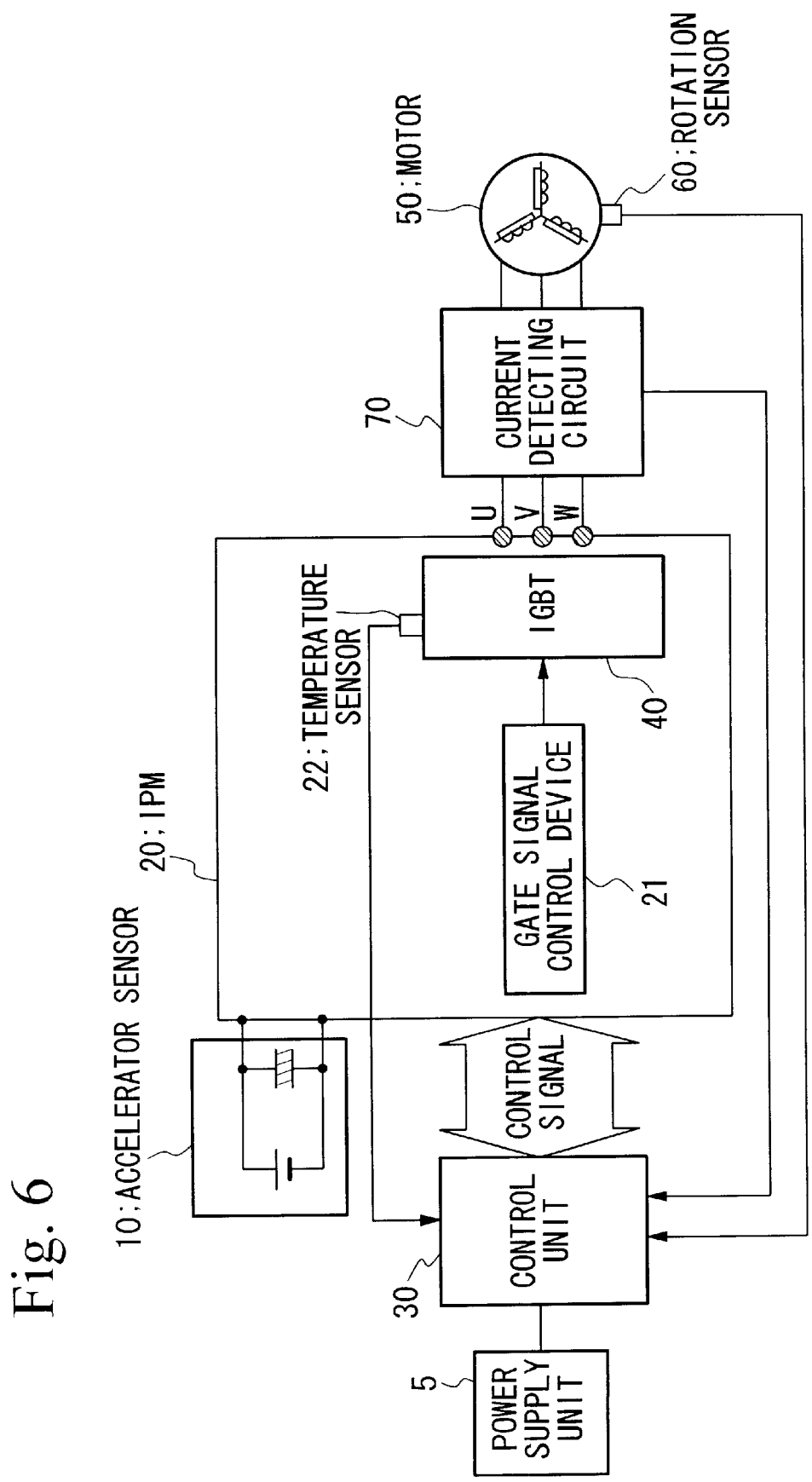
FIG. 6 is a schematic block diagram showing the structure of a control apparatus for an electric vehicle according to the second embodiment of the present invention.

The control unit 30 sequentially switches the current supply phase of the IGBT 40 by the control signal for rotating the motor 50. For example, as shown in FIG. 6 (*f*), when the vehicle is fallen in the stall state, the control for reducing the motor driving current is carried out. In addition, as shown in FIG. 6 (*g*), when the motor rotates in the reverse direction due to reduction of the motor driving force and the prescribed normal curret supply phase is connected, the control unit 30 executes a control for increasing the motor driving current in this current supply phase.

The second embodiment of the present invention is described below with reference to FIG. 6. FIG. 6 is a block diagram showing the structure of the control apparatus for an electric vehicle according to the second embodiment of the present invention. In FIG. 6, the components corresponding to those of the first embodiment are denoted by the same reference numerals and their explanations are omitted. A temperature sensor 22 is disposed near the IGBT elements, particularly in the vicinity of the IGBT element V or the IGBT element Y, in which heat tends to concentrate, and the temperature sensor 22 detects the temperature of the IGBT elements V or Y, and outputs the result to the control unit 31.

The control unit 31 sets the phase including the IGBT element V or the phase including the IGBT Y as the current supply phase based on the location of the temperature sensor 22. Thereby, the temperature of the IGBT element which experiences the high temperature rise can be detected, and it becomes possible to control and to prevent the heat generation in the IGBT elements. Accordingly, the overheating of these IGBT elements can be prevented in a more effective manner.

In the above-described explanation, although it is described that the IGBT comprises six IGBT elements, but the number of IGBT elements is not limited to six.

When the motor rotates in the reverse direction, although the vehicle moves backwards, the backward movement of the vehicle is so small that the driver is not aware of the movement of the vehicle because of the high gear reduction ratio (defined as the ratio of the number of revolutions of the motor to the number of revolutions of the wheels). Consequently, the vehicle is substantially held (stopped) in place.

In step S8, the control is carried out for the normal current supply phase such that the current supply current value is increased from the reduced value, but a predetermined current can flow through the normal current supply phase when it is detected that the normal current supply phase becomes a phase capable of handling the flow of the current.

It is also noted that the above-described control device for the electric vehicle can be applied to either vehicles such as hybrid vehicles (driven by an engine and a motor) or to electric vehicles (driven only by the motor).

As described above, according to the first aspect, the control apparatus of the electric vehicle of the present invention is provided such that, when the vehicle stops on a steep uphill because the load applied to the motor equals to the output of the motor, or when the temperature of a electric element of the inverter circuit exceeds a predetermined temperature, the control apparatus of the electric vehicle reduces or terminates the supply of the electric power to the motor. Accordingly, due to the reduction in the output of the motor, the vehicle moves backward. Then, the rotating position of the motor in the reverse direction is detected, and in response to the detected rotational position, the electric power element normally supplying power to the inverter circuit is then switched to another element in order to continuously supply the power to the motor and maintain the driving force of the vehicle so as to not move backward. The control apparatus of the electric vehicle of the present invention is constituted such that it maintains or increases the current-supply to the motor, and since the electric power element, after a switch is made so that it is not the current-supply element normally supplying the current is no longer being heated, it is possible to protect the elements constituting the inverter circuit from overheating. As a result, it becomes possible to use an element for constituting the inverter circuit (for example, an IGBT element) which has a standard low current-carrying capacity, which results in a reduction in the cost of the apparatus.

Furthermore, as described above, since the size of the inverter circuit can be reduced, an effect is obtained according to the present invention, that the inverter circuit can be easily installed in the vehicle.

Furthermore, as described above, since the size of the inverter circuit can be reduced, an effect is obtained, according to the present invention, that the weight of the vehicle can be reduced and the energy consumption of the vehicle can be improved.

According to the second aspect, a control apparatus is provided such that the current-carrying phase is switched depending on the time over which an electric power element is energized, and therefore, it becomes possible to control the temperature of the electric power element depending on the amount of heat generated in the electric power element and to prevent the electric power element from overheating.

What is claimed is:

1. A control apparatus for an electric vehicle, which has a motor driven by electric power supplied from an inverter comprised of a plurality of power elements and the vehicle being propelled by an output of said motor, comprising:

a power reducing device for reducing the electric power to be supplied to said power elements of the inverter, when the temperature of the power elements of the inverter exceeds a predetermined temperature;

a rotation detecting circuit for detecting whether the motor is rotating in a reverse direction, wherein when the motor is rotating in the reverse direction, the power supplied to the power elements is reduced as a function of the load on the motor;

a switching device for switching the current supplying power elements from the current supplying power elements used up until that time to the current supplying power elements corresponding to the change of the rotational position; and an electric power increasing device for increasing or starting the supply of said electric power to said electric power elements after said switching device has performed the switch.

2. A control apparatus of a vehicle according to claim 1, wherein said power reducing device reduces the electric power for supplying to said power element
when the temperature detected by a temperature sensor for detecting the temperature of said electric power element exceeds a predetermined temperature, or
when the length of time for providing electric power through the same power elements exceeds a predetermined time.

\* \* \* \* \*